United States Patent
Kajitani

(12) 
(10) Patent No.: US 6,215,626 B1
(45) Date of Patent: Apr. 10, 2001

(54) MAGNETIC HEAD SLIDER SUPPORT MECHANISM WITH IMPROVED LOAD DISTRIBUTION AND A MAGNETIC DISK DRIVE UTILIZING SAME

(75) Inventor: Hiroshi Kajitani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/232,220

(22) Filed: Jan. 19, 1999

(30) Foreign Application Priority Data

Jan. 20, 1998 (JP) .................................................. 10-008373

(51) Int. Cl.[7] ........................................................ G11B 5/48
(52) U.S. Cl. ..................... 360/245.1; 360/246.3; 360/246.4
(58) Field of Search ............................... 360/245.1, 246.3, 360/246.4

(56) References Cited

U.S. PATENT DOCUMENTS

| | | | |
|---|---|---|---|
| 4,399,476 | * | 8/1983 | King ...................................... 360/104 |
| 5,243,482 | * | 9/1993 | Yamaguchi ........................... 360/104 |

FOREIGN PATENT DOCUMENTS

| | | |
|---|---|---|
| 53-67416 | 6/1978 | (JP) . |
| 5-508808 | 1/1993 | (JP) . |
| 10-11729 | 1/1998 | (JP) . |

OTHER PUBLICATIONS

Japanese Office Action dated Jul. 11, 2000, with partial translation.
Hamilton, Harold; "Contact Recording on Perpendicular Rigid Media"; Journal of the Magnetics Society of Japan; vol. 15 Supplement, No. S2; 1991; pp. 483–490.

* cited by examiner

*Primary Examiner*—A. J. Heinz
(74) *Attorney, Agent, or Firm*—McGinn & Gibb, PLLC

(57) ABSTRACT

Disclosed is a magnetic head slider support mechanism which has: a slide-type magnetic head slider with one or more contact parts to slide contacting a magnetic disk in recording and reproduction, the slide-type magnetic head slider being supported by the magnetic head slider support mechanism and conducting the recording and reproduction through one of the contact parts; a beam suspension that rotatively moves in a direction that the track of the magnetic disk D is traversed and that applies a load directed to the magnetic disk side to the magnetic head slider; a platelike gimbal that is provided at the rotational end of the beam suspension and holds the magnetic head slider while allowing the magnetic head slider to oscillate; and a load arm that extends, as one united body, from the gimbal and is bent in a direction that the end of the load arm contacts pressing against the back surface of the magnetic head slider. Also, a magnetic disk device equipped with the magnetic head slider support mechanism is disclosed.

60 Claims, 6 Drawing Sheets

MAGNETIC HEAD SLIDER SUPPORT MECHANISM WITH IMPROVED LOAD DISTRIBUTION AND A MAGNETIC DISK DRIVE UTILIZING SAME

FIELD OF THE INVENTION

This invention relates to a magnetic head slider support mechanism and a magnetic disk device, and more particularly to a magnetic head slider support mechanism that conducts the contact recording and reproduction, and relates to a magnetic disk device equipped with the magnetic head slider support mechanism.

BACKGROUND OF THE INVENTION

The enhancement of recording density of a magnetic disk device has been attained by enhancing the magnetic characteristic of the magnetic head and recording medium, and by shortening the distance from the gap end of magnetic head to the surface of the magnetic layer of the recording medium, i.e., the magnetic spacing.

Currently, the magnetic spacing is about 40 to 50 [nm], depending on the air bearing surface protecting film of a flying head slider that is loaded with a magnetic head and flies on air film, the protecting film or lubricating film on the surface of the medium, and the roughness of the surface of the medium. To realize a recording density of 10 to 20 [Gb] or more per square inches in the future, the magnetic spacing is required to be smaller than 15 [nm].

As one means for such requirement, slide-type magnetic disk devices, which conduct the recording and reproduction while keeping contact-sliding on a recording medium, that can remarkably shorten the distance between a magnetic head and the surface of the magnetic layer of a recording medium have been developed (e.g., H. Hamilton, Journal of Magnetic Society of Japan vol. 15, Supplement No. S2(1991)483, and Japanese patent application No.5-508808).

FIG. 1 is an illustrative front view showing the basic composition of a conventional slide-type magnetic disk device 100. This slide-type magnetic disk device 100 is composed of a slide-type magnetic head 107, a magnetic head slider 101 that is loaded with the slide-type magnetic head 107, and a suspension spring 106 that supports the magnetic head slider 101 and presses it against a magnetic recording medium D.

The suspension spring 106 is connected through a positioning actuator arm 112 with a positioning actuator 102 that moves the slide-type magnetic head 107 on the magnetic recording medium D. The suspension spring 106 is made of a sheet of leaf spring, and presses the magnetic head slider 101 against the magnetic recording medium D, using the bending of the entire leaf spring.

FIGS. 2A and 2B are perspective views showing the details of the magnetic head slider 101 and the suspension spring 106. FIG. 2A shows the suspension spring 106 and the magnetic head slider 101 supported thereby, and FIG. 2B shows the enlarged magnetic head slider 101. FIG. 2C is a partially-broken enlarged perspective view showing a contact pad 108 provided on the lower surface of the magnetic head slider 101. As shown, a yoke 111 is buried in the contact pad 109 formed at the tip of the magnetic head 107, and conducts the contact recording and reproduction, on the suspension spring 106, electric wiring 113 is formed directly.

Although the suspension spring 106 in the above example made is of a sheet of leaf spring, a slide-type magnetic disk device to which a gimbal mechanism is added to improve the follow-up performance to the medium has been also developed. FIG. 3 is an illustrative front view showing the basic composition of such a conventional slide-type magnetic disk device 130. Like parts in FIG. 3 are indicated by like reference numerals as used in FIG. 1, and explanations thereof are omitted herein.

In this conventional example, the magnetic head slider support mechanism is composed of a gimbal 121 to support the magnetic head slider 101, and a beam suspension 106 to support the gimbal 121 and to give a load to the magnetic head 107.

By the way, in conducting the seek or tracking operation on the magnetic recording medium, the suspension composing the slide-type magnetic head support mechanism is required to have high rigidity in the radius and circumference directions of the recording track, and to have sufficient strength to cause a frictional force or viscous fluid force to be generated between the magnetic head slider and the lubricant coated on the surface of the magnetic recording medium.

Also, to allow the magnetic head slider to follow up contacting or having micro clearance with the surface of the magnetic recording medium, the magnetic head slider must also have suitable flexibility as to be able to accept the rolling (i.e., rotation movement around the axial parallel to the running direction of the magnetic recording medium) and pitching (i.e., rotation movement around the axis tangential to the recording track) of the magnetic head slider is simultaneously required.

Furthermore, to obtain the medium follow-up performance, it is important that suitable load is applied to the slide pad on the magnetic head slider. In general, for flying-type sliders, a suspension with one-point pivot is often used.

Since the rigidity of the air film generated at the air bearing surface of the flying slider is very high and a suitable load distribution can be realized by optimizing the shape of the air bearing surface, the suspension is required to receive such application of load as not to prevent the movement characteristic of the slider. For this requirement, the one-point pivot support does not prevent the movement characteristic defined by the air bearing rigidity of the slider since it ideally supports the slider at one point. Therefore, excellent characteristic can be obtained.

However, in the slide-type magnetic head slider, at first, when the pad contacts the magnetic recording medium at one point, it is, at least, required that the slider applies a load to the medium so as to be always kept parallel to the medium. If the pad is even slightly inclined to the medium, part of the magnetic head will jump that much, thereby necessary characteristics of recording and reproduction cannot be obtained.

In applying the one-point pivot load, though the load can be theoretically applied to the pad, it is required that the magnitude and position of the load to be applied are provided at a very high precision. In the gimbal shown in FIG. 3, the contact state of the pivot after assembling is fixed. Therefore, in relation to the assembly tolerance, it is, in substance, very difficult to obtain the uniform contact between the pad and the medium.

On the other hand, in the case of multiple pads (i.e., more than three pads), since the attitude of the slider is determined in a virtual plane of the pad surface, even with the one-pivot load, the jump amount of the pad provided for the magnetic head becomes hard to be affected by the assembly tolerance, compared with the case of one pad.

However, the distribution of surface pressure that the respective pads receive is often dispersed due to the position tolerance of the one-point pivot in the slider. When optimum load distribution is not obtained, the abrasion at part of the pads becomes uneven among the respective pads, thereby incurring biased abrasion.

This biased abrasion is not so serious for the follow-up of track, but, in seeking, the abrasion characteristic becomes uneven between in-seek and out-seek. Therefore, the fine positioning operation cannot be conducted. Also, to attain the ideal one-point pivot support, the rigidity of the suspension has to be considerably increased. Therefore, its weight saving is hard to reduce the weight of the suspension.

Next, surface loading system, instead of the one pivot loading system, is considered. In this system, the entire part of the gimbal spring the supporting the slider applies a load to the slider, and an even load can be theoretically applied to the back surface of the slider. Also, this system is advantageous for weight saving because the load beam and the gimbal can be integrally formed.

However, the surface loading system has a problem that, due to the assembly tolerance, the slider is often subject to some load and moment being continuously applied, therefore increasing the dispersion of load that the respective pads receive.

SUMMARY OF THE INVENTION

Accordingly, it is an object of the invention to provide a slide-type magnetic head slider support mechanism that has good productivity and allows a load applied to the contact pads to be optimally distributed.

It is a further object of the invention to provide a magnetic disk drive with such a slide-type magnetic head slider support mechanism.

According to the invention, a magnetic head slider support mechanism, comprising:

a slide-type magnetic head slider with one or more contact parts to slide while contacting a magnetic disk in recording and reproduction, the slide-type magnetic head slider being supported by the magnetic head slider support mechanism and conducting the recording and reproduction through one of the contact parts;

a beam suspension that rotatively moves in a direction that the track of the magnetic disk D is traversed and that applies a load directed to the magnetic disk side to the magnetic head slider;

a platelike gimbal that is provided at the rotational end of the beam suspension and holds the magnetic head slider while allowing the magnetic head slider to oscillate; and a load arm that extends, as one united body, from the gimbal and is bent in a direction so that the end of the load arm contacts and presses against the back surface of the magnetic head slider.

According to another aspect of the invention, a magnetic disk device equipped with such a magnetic head slider support mechanism.

BRIEF DESCRIPTION OF THE DRAWINGS

The invention will be explained in more detail in conjunction with the appended drawings, wherein.

DESCRIPTION OF THE PREFERRED EMBODIMENT

Figure 1:
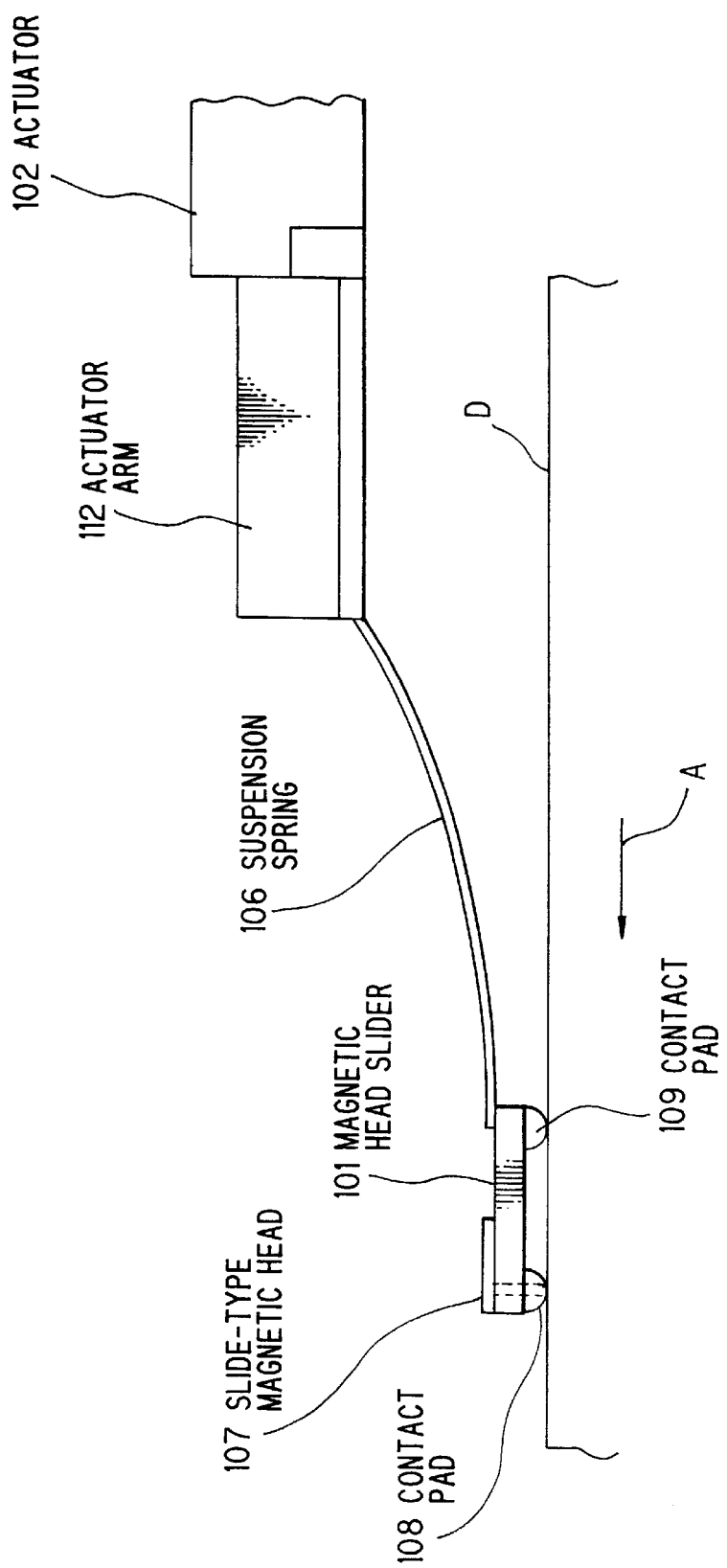
FIG. 1 is a side view showing the conventional slide-type magnetic disk device.
Figure 2A:
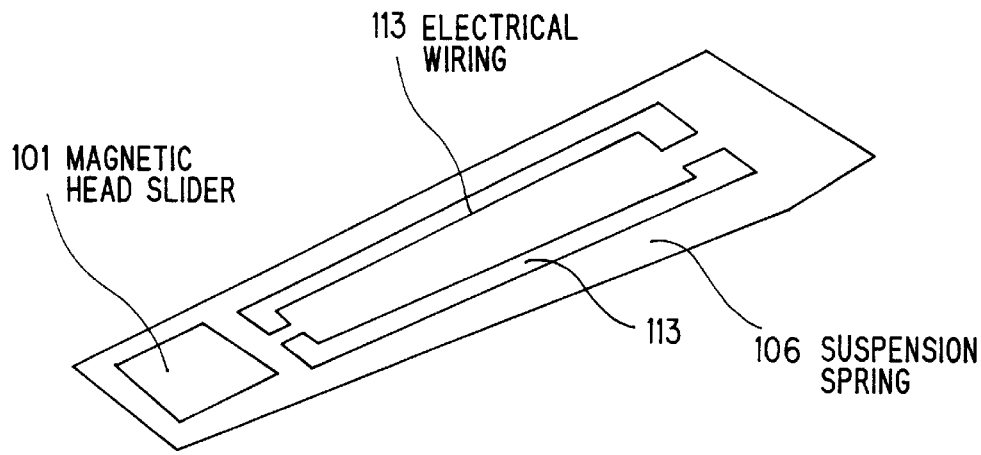
FIG. 2A is a perspective view showing the suspension spring and the magnetic head slider supported by the suspension spring in FIG. 1.
Figure 2B:
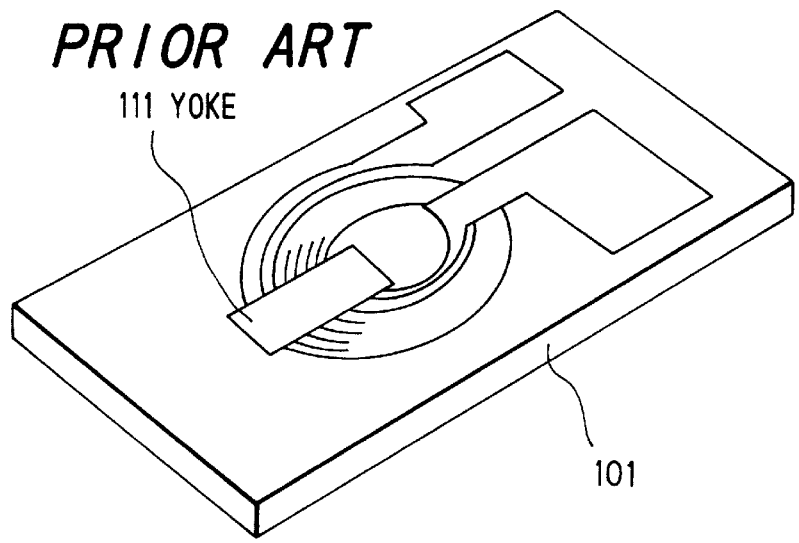
FIG. 2B is an enlarged perspective view showing the magnetic head slider in FIG. 1.
Figure 2C:
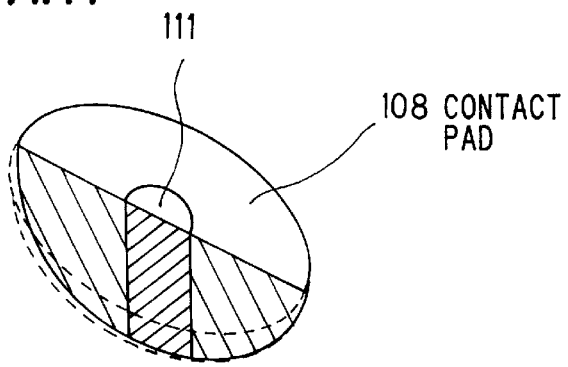
FIG. 2C is an enlarged perspective and cross-sectional view showing the contact pad provided under the magnetic head slider in FIG. 1.
Figure 3:
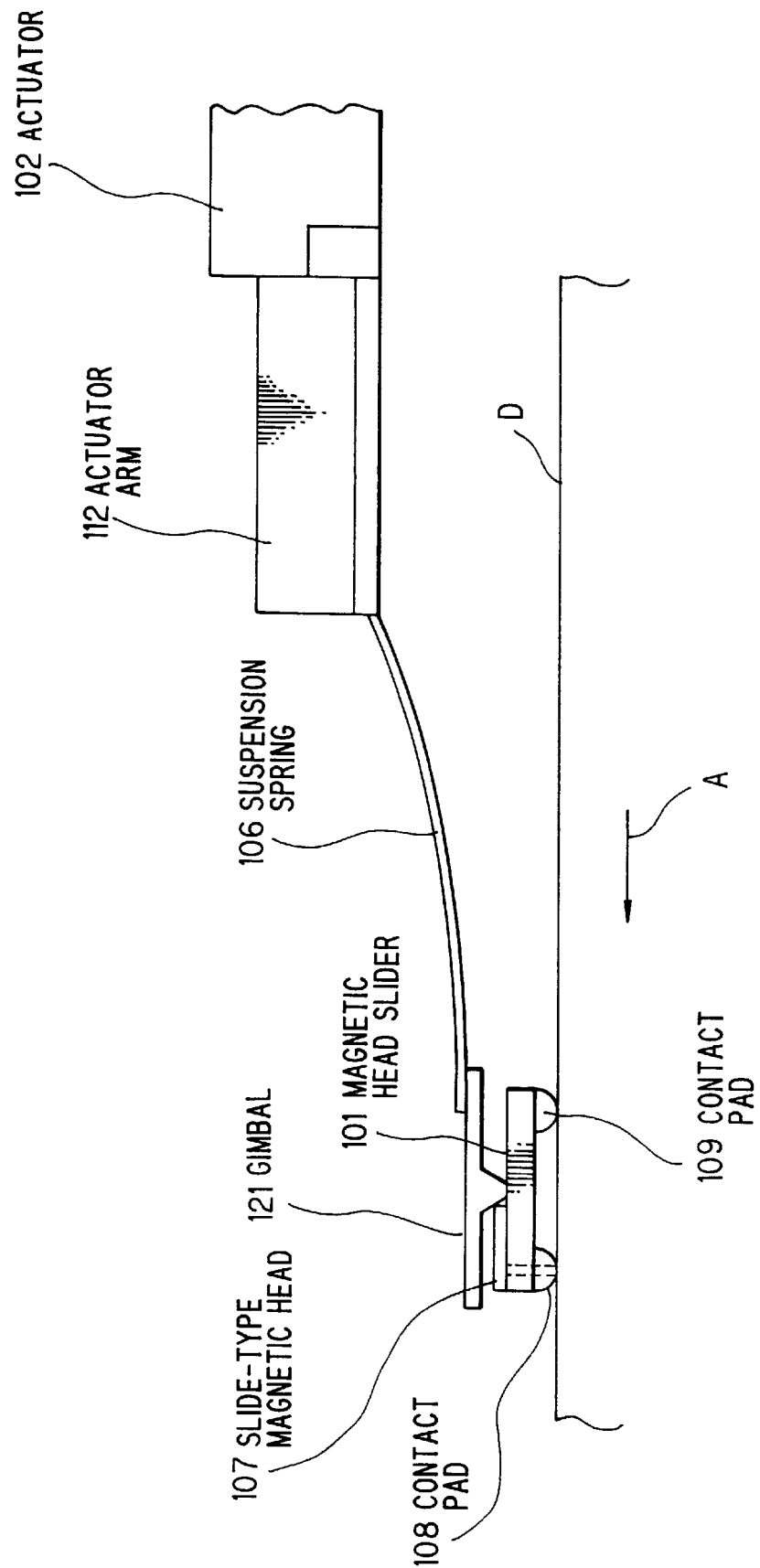
FIG. 3 is a side view showing the other conventional slide-type magnetic disk device using the gimbal mechanism.

The preferred embodiment will be in detail explained below, referring to FIGS. 4 to 6.

In this embodiment, shown is a magnetic disk device 50 with a magnetic head slider support mechanism 10 to support a slide-type magnetic head slider 1 that has three contact pads 11, 12 and 12, as contacting parts, and slidably contacts a magnetic disk D in the recording and reproduction and conducts the recording and reproduction through one of them, the contact pad 11.

The magnetic head slider support mechanism 10 is composed of a beam suspension 20 that rotatively moves in a direction (i.e., tracking direction T) that the track of the magnetic disk D is traversed and that applies a load directed through the magnetic disk D side to the magnetic head slider 1, and a platelike gimbal 30 that is provided at the rotational end of the beam suspension 20 and holds the magnetic head slider 1 while allowing it to oscillate.

Furthermore, the magnetic head slider support mechanism 10 is composed of three load arms 41, 42 and 42 that extend, as one united body, from the gimbal 30 and are bent in a direction so that their ends contact and press against the back surface of the magnetic head slider 1.

Figure 4:
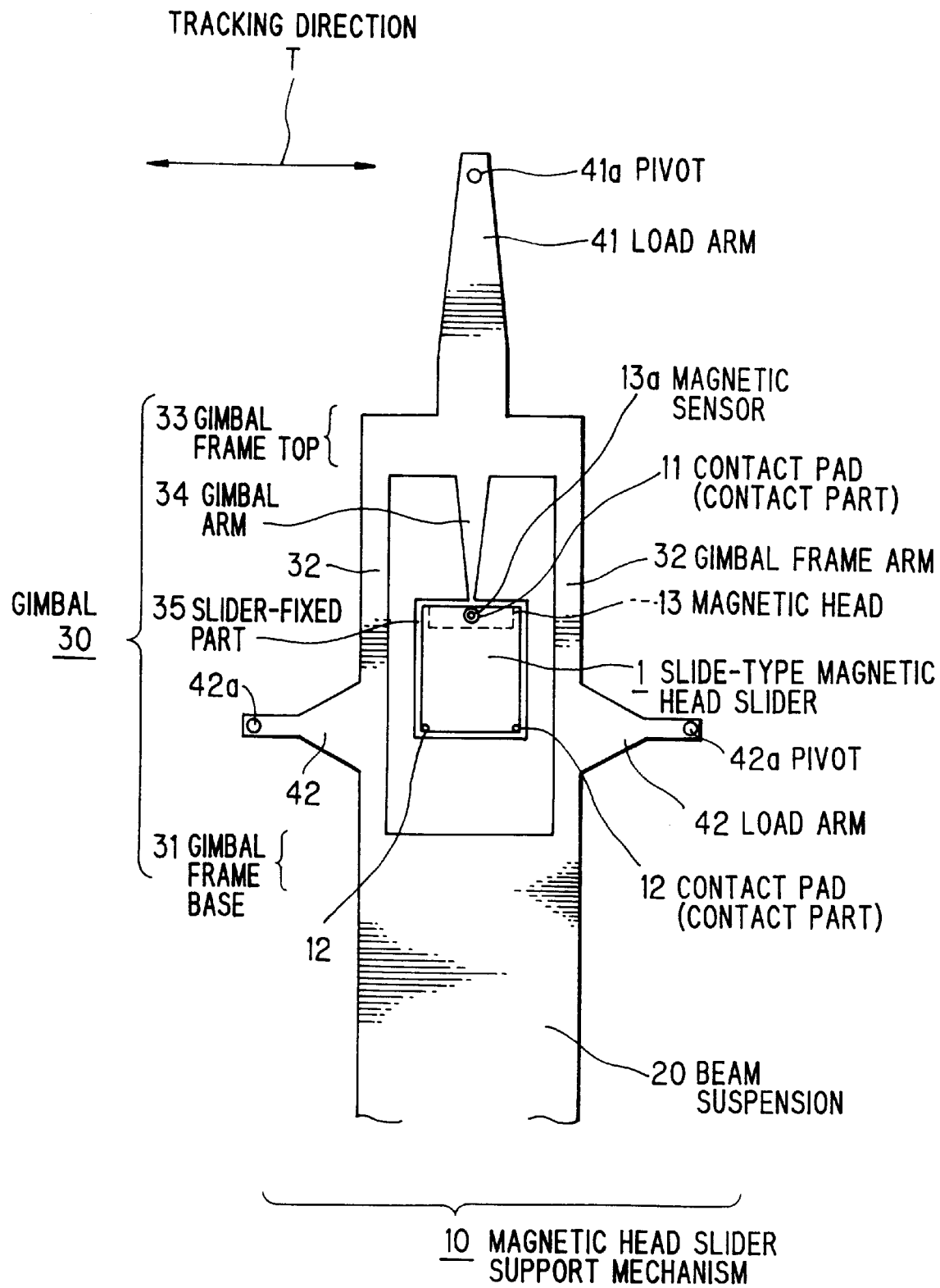
FIG. 4 is a bottom view showing a slide-type magnetic head slider support mechanism, before bending its load arms, in a preferred embodiment according to the invention.

FIG. 4 is a bottom view, which is viewed from the magnetic disk D side, showing the magnetic head slider support mechanism 10 before bending the load arms 41, 42 and 42.

On the upper surface of the slide-type magnetic head slider 1, there are provided an air-film flying type slider, which is currently used in general, and a magnetic head 13 whose magnetic sensor part 13a is opposite to the magnetic disk D side while penetrating through the contact pad 11. Also, the slide-type magnetic head slider 1 is bonded to the part of the gimbal 30 through an adhesive.

Figure 6:
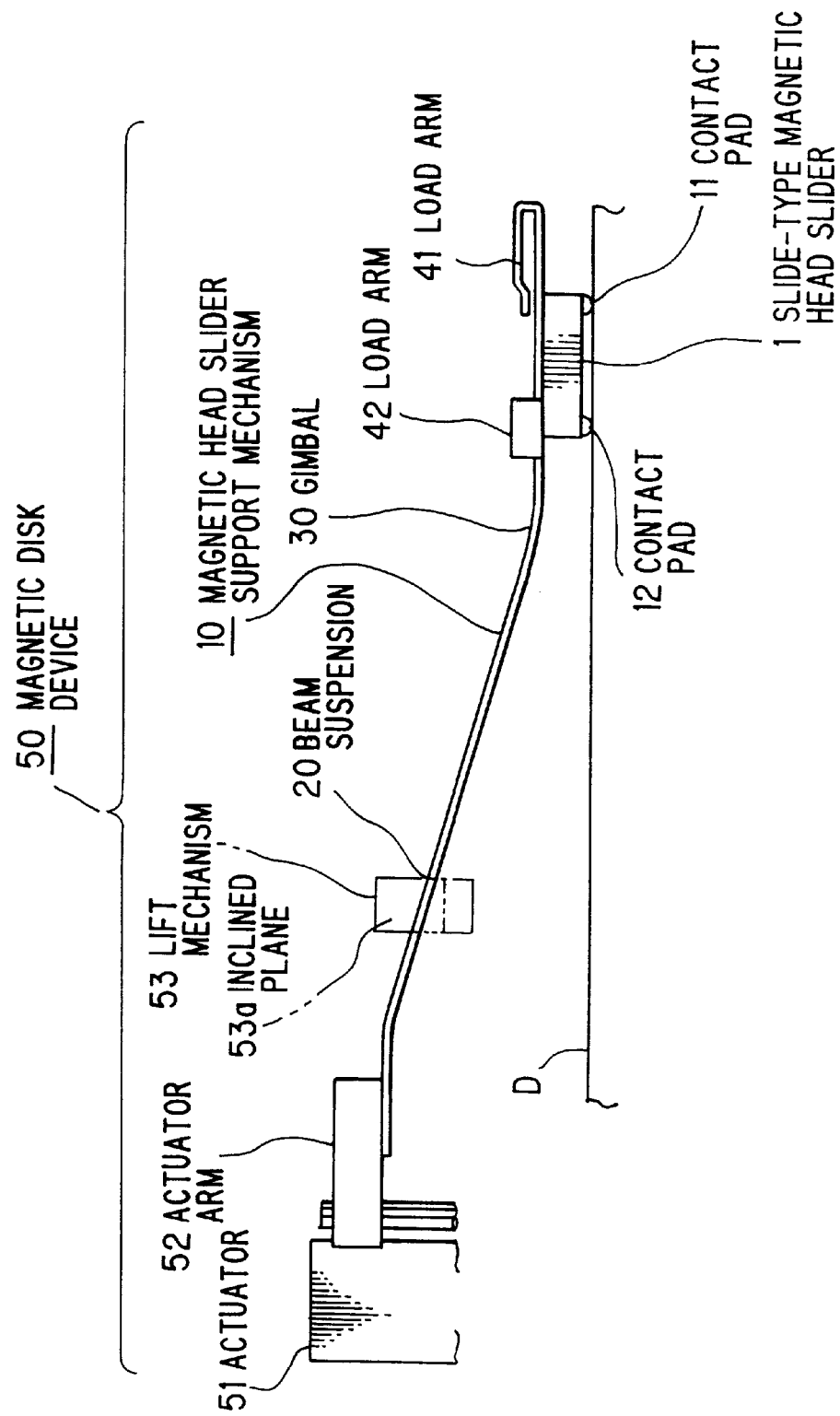
FIG. 6 is a side view showing a slide-type magnetic disk device in a preferred embodiment according to the invention.

The gimbal 30 has a strip-shaped and flexible platelike body that is integrally formed with the beam suspension 20 as shown in FIG. 6. The rear end of the beam suspension 20 is connected to an actuator arm 52, which rotatively moves. Further, the device is equipped with a positioning actuator for moving the slide-type magnetic head 1 on the magnetic recording medium D. The beam suspension 20 is bent toward to the magnetic disk D side from the actuator arm 52, and generates a pressing load directed to the magnetic recording medium D side through the magnetic head slider 1 and the gimbal 30.

On the other hand, the gimbal 30 is located at the rotational end of the beam suspension 20, and its connection part with the beam suspension 20 composes a gimbal frame base 31 that is part of the gimbal 30. Also, two gimbal frame arms 32 extend from the gimbal frame base 31 parallel along the extension direction of the beam suspension 20, and the ends of the gimbal frame arms 32 are connected with a gimbal frame top 33. Further, through a gimbal arm 34 extending from the gimbal frame top 33 in the direction of the gimbal frame base 31, a slider-fixed part 35 where the magnetic head slider 1 is held is provided between the two gimbal frame arms 32.

The gimbal 30 is, as described earlier, formed, as a rectangular frame and is provided with the slider-fixed part 35 to hold the magnetic head slider 1, at its central part. The slider-fixed part 35 is supported by one gimbal arm 34, therefore allowing the magnetic head slider 1 to oscillate in the rolling and pitching directions. Here, the gimbal frame base 31, gimbal frame arms 32, gimbal frame top 33, gimbal arm 34 and slider-fixed part 35 which compose the gimbal 30 are integrally formed as a single plate.

From the gimbal frame top 33, one load arm 41 extends in the extension direction of the beam suspension 20. Also, outward from the respective gimbal frame arms 32, the load arms 42, 42 extend. These load arms 41, 42 and 42 are integrally formed with the gimbal 30.

Figure 5:
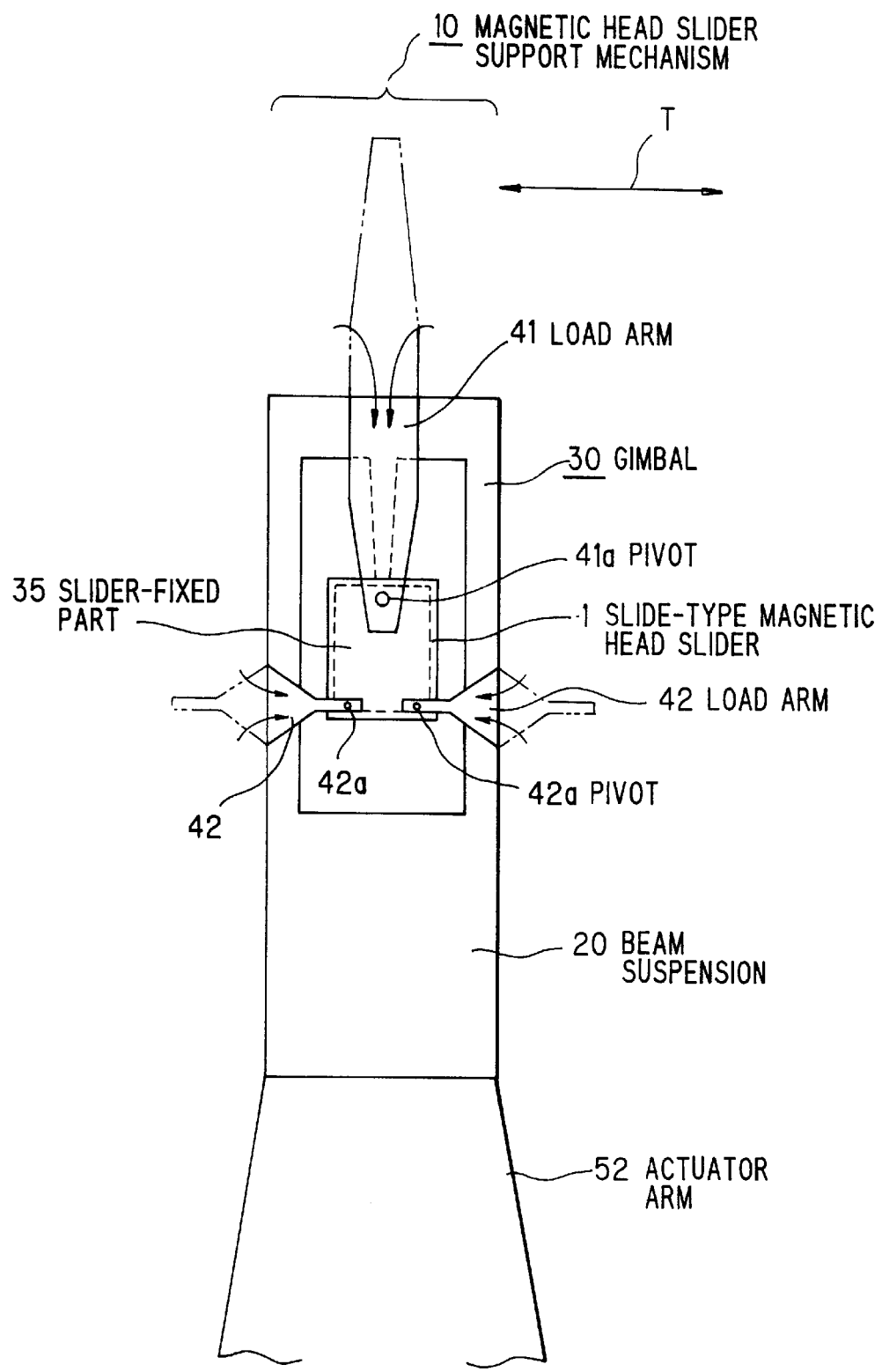
FIG. 5 is a top view showing the slide-type magnetic head slider support mechanism, after bending its load arms, in FIG. 4.

The load arms 41, 42 and 42 are, as shown in FIG. 5, bent inside at the boundary between them and the gimbal 30. Thereby, the respective ends of the load arms 41, 42 and 42 abut on the back surface of the magnetic head slider 1, i.e., on the backside of the surface where the magnetic head slider 1 is mounted on the slider-fixed part 35. At the respective ends of the load arms 41, 42 and 42, there are provided projecting pivots 41a, 42a and 42a that protrude in the direction of the slider-fixed part 35. These pivots 41a, 42a and 42a are point-contacting the slider-fixed part 35 separately at positions corresponding to the contact pads 11, 12 and 12, respectively, and are applying a load thereto. In this case, the loads applied to the respective contact pads 11, 12 and 12 are determined by load bending angles given to the respective load arms 41, 42 and 42.

Numeral 53 in FIG. 6 indicates a lift and drop mechanism for the magnetic disk device 50. This lift and drop mechanism 53 employs a so-called ramp road system. It is provided with an inclined plane 53a that, when the magnetic head slider 1 withdraws from the recording surface of the magnetic disk D, contacts the lower surface of the rotating beam suspension 20 and lifts the beam suspension 20 to guide the magnetic head slider 1 in a direction away from the magnetic disk D.

As described above, the magnetic disk device 50 conducts the recording and reproduction as the magnetic head slider 1 held by the magnetic head slider support mechanism 10 slides while contacting the magnetic disk D and while applying a load directed to the magnetic disk D side to the magnetic head slider 1 through the beam suspension 20. Hereupon, the follow-up performance of the magnetic head slider 1 in the rolling and pitching directions to the recording surface of the magnetic disk D is secured by the gimbal arm 34 of the gimbal 30.

After completing the recording or reproduction, the magnetic head slider 1 withdraws from the recording surface of the magnetic disk D. As the magnetic head slider 1 moves outside the magnetic disk D, the beam suspension 20 contacts the inclined plane 53a of the lift and drop mechanism 53, and then is guided along the inclined plane 53a in the direction away from the magnetic disk D.

Therefore, in the non-recording and non-reproduction states where the rotation of the magnetic disk D stops, the magnetic head slider 1 is always apart from the magnetic disk D. Thereby, the adsorption between the magnetic head slider and the magnetic disk D can be prevented. Derived from this, since the occurrence of adsorption is prevented, the flatness of the recording surface of magnetic disk can be set higher, and a magnetic disk device 50 with more freedom concerning the selection of lubricant provided on the surface of magnetic disk can be provided. Thus, a magnetic disk device 50 with lower jump and higher recording density can be provided.

Furthermore, the load distribution at the contact pads 11, 12 and 12 of the magnetic head slider 1 is adjusted by the bending angle of the load arms 41, 42 and 42, respectively. Namely, if the pressing loads against the contact pads 11, 12 and 12 are dispersed, the adjustment is conducted by changing the bending angle of the load arms 41, 42 and 42, respectively. In this case, since the assembly tolerance of the entire gimbal 30 is far smaller than that of the entire magnetic head slider support mechanism 10, finer pad load distribution can be obtained.

By such fine load distribution, the biased abrasion of the contact pads 11, 12 and 12 can be suppressed and the jump amount of the pad can be reduced. Therefore, the magnetic disk device 50 can have excellent signal recording and reproduction characteristics, and faster and finer positioning characteristics.

Also, for the magnetic head slider support mechanism 10, the load arms 41, 42 and 42, gimbal 30 and beam suspension 20 are integrally formed as a metal plate, and, in its manufacturing process, the bending process is conducted instead of the installing process such as melting and bonding. Thus, the process can be easily conducted and the productivity can be enhanced. Also, for the bending process, the adjustment after the installation is easier than that for bonding process and therefore high precision is not required. Because of this, the productivity can be further enhanced.

Also, since the magnetic head slider support mechanism 10 is provided with three load arms, a single plane can be determined by the respective contact points, and the magnetic head slider 1 can be easily set in a predetermined direction.

Further, since the load from the respective load arms 41, 42 and 42 is applied corresponding to the position of the contact pads 11, 12 and 12 of the magnetic head slider 1, the load from the respective load arms is almost directly to the corresponding contact pads. Therefore, the load distribution can be easily comprehended, and therefore the adjustment of load distribution can be easily conducted.

Also, the lift and drop mechanism 53 for the slide-type magnetic head slider support mechanism 10 is not limited to that described above, and, alternatively, any mechanisms that can lift the slider by a predetermined distance from the recording surface of the magnetic disk D when the device stops are applicable.

ADVANTAGES OF THE INVENTION

The magnetic head slider support mechanism of this invention is provided with the load arms that are integrally formed with the gimbal and are bent. Therefore, the adjustment of position and magnitude of load applied to the backside of the magnetic head slider can be easily performed by changing the bending angle of the load arms. Also, the pressing load against the magnetic head slider can be applied at good precision.

Especially, even when the magnetic head slider is provided with multiple contact parts, the load can be precisely distributed to the respective contact parts. Therefore, the biased abrasion of the respective contact parts can be suppressed, and the jump amount of contact part can be also reduced. Accordingly, the magnetic disk device with this magnetic head slider support mechanism can have excellent signal recording and reproduction characteristics, and faster and finer positioning characteristics.

Also, in the magnetic head slider support mechanism, the load arms and gimbal are integrally formed as a single plate. Therefore, in its manufacturing process, the bending process can be conducted instead of the installing process such as melting and bonding. Thus, the process can be easily conducted and the productivity can be enhanced. Also, for the bending process, the adjustment after the installation is easier than that for bonding process and therefore high precision is not required. Because of this, the productivity can be further enhanced.

Also, when the magnetic head slider is disposed at the center of the gimbal, the width of selection for the position setting of load arms can be enlarged, and the load can be applied from any directions.

Providing the multiple load arms allows the load to be applied from the multiple points of the magnetic head slider. Thereby, the load distribution to the multiple contact parts can be made easier.

Especially, when the three load arms are provided, a single plane can be determined by the respective contact points of the load arms, and it becomes easy to conduct the recording and reproduction while positioning the magnetic head slider in a predetermined direction. Therefore, the biased abrasion of the respective contact parts can be suppressed, and the jump amount of the contact part can be also reduced. Accordingly, the magnetic disk device with this magnetic head slider support mechanism can have excellent signal recording and reproduction characteristics, and faster and finer positioning characteristics.

Further, since the load from the respective load arms is applied corresponding to the position of the contact parts of the magnetic head slider, the load from the respective load arms is conveyed almost directly to the corresponding contact parts. Therefore, the load distribution can be easily comprehended, and therefore the adjustment of load distribution can be easily conducted.

Furthermore, since the magnetic disk device is provided with the lift and drop mechanism, in the non-recording and non-reproduction states where the rotation of the magnetic disk D stops, the magnetic head slider can be apart from the magnetic disk D. Thereby, the adsorption between the magnetic head slider and the magnetic disk D can be prevented. Derived from this, since the occurrence of adsorption is prevented, the flatness of the recording surface of magnetic disk can be set higher, and the magnetic disk device with more freedom concerning the selection of lubricant provided on the surface of magnetic disk can be provided. Thus, the magnetic disk device with lower jump and higher recording density can be provided.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A magnetic head slider support mechanism, comprising:

a slide-type magnetic head slider with one or more contact parts to slide while contacting a magnetic disk in recording and reproduction, said slide-type magnetic head slider being supported by said magnetic head slider support mechanism and conducting said recording and reproduction through one of said contact parts;

a beam suspension that rotatively moves in a direction that a track of a magnetic disk is traversed and that applies a load directed to said magnetic disk side of said magnetic head slider;

a platelike gimbal that is provided at a rotational end of said beam suspension and holds said magnetic head slider while allowing said magnetic head slider to oscillate; and a load arm that is integrally formed with said platelike gimbal and extends from said gimbal and has a first bend upward and away from said magnetic disk side of said magnetic head slider whereby said load arm is caused to be bent back over said gimbal and a second bend inward toward said magnetic head slider so that an end of said load arm contacts and presses against said back surface of said magnetic head slider.

2. A magnetic head slider support mechanism, according to claim 1, wherein:

said magnetic head slider is located in a center portion of said gimbal, and said load arm extends outside said gimbal and said first bend and second bend are formed so that said end of said load arm is within said center portion of said gimbal.

3. A magnetic head slider support mechanism, according to claim 1, wherein:

said load arm comprises a plurality of load arms.

4. A magnetic head slider support mechanism, according to claim 2, wherein:

said load arm comprises a plurality of load arms.

5. A magnetic head slider support mechanism, according to claim 3, wherein:

said load arm comprises three load arms.

6. A magnetic head slider support mechanism, according to claim 4, wherein:

said load arm comprises three load arms.

7. A magnetic head slider support mechanism, according to claim 1, wherein:

a number of said load arms provided is equal to a number of said contact parts of said magnetic head slider.

8. A magnetic head slider support mechanism, according to claim 2, wherein:

a number of said load arms provided is equal to a number of said contact parts of said magnetic head slider.

9. A magnetic head slider support mechanism, according to claim 7, wherein:

an end of said load arm contacts and presses against said magnetic head slider at a position of a corresponding contact part on said back surface of said magnetic head slider.

10. A magnetic head slider support mechanism, according to claim 8, wherein:

an end of said load arm contacts and presses against said magnetic head slider at a position of a corresponding contact part on said back surface of said magnetic head slider.

11. A magnetic head slider support mechanism, according to claim 1, wherein:

said load arms each contact said magnetic head slider through a pivot provided on an end of said load arms.

12. A magnetic head slider support mechanism, according to claim 2, wherein:

said load arms each contact said magnetic head slider through a pivot provided on an end of said load arms.

13. A magnetic head slider support mechanism, according to claim 3, wherein:
said load arms each contact said magnetic head slider through a pivot provided on an end of said load arms.

14. A magnetic head slider support mechanism, according to claim 4, wherein:
said load arms each contact said magnetic head slider through a pivot provided on an end of said load arms.

15. A magnetic head slider support mechanism, according to claim 5, wherein:
said load arms each contact said magnetic head slider through a pivot provided on an end of said load arms.

16. A magnetic head slider support mechanism, according to claim 6, wherein:
said load arms each contact said magnetic head slider through a pivot provided on an end of said load arms.

17. A magnetic head slider support mechanism, according to claim 7, wherein:
said load arms each contact said magnetic head slider through a pivot provided on an end of said load arms.

18. A magnetic head slider support mechanism, according to claim 8, wherein:
said load arms each contact said magnetic head slider through a pivot provided on an end of said load arms.

19. A magnetic head slider support mechanism, according to claim 9, wherein:
said load arms each contact said magnetic head slider through a pivot provided on an end of said load arms.

20. A magnetic head slider support mechanism, according to claim 10, wherein:
said load arms each contact said magnetic head slider through a pivot provided on an end of said load arms.

21. A magnetic disk device equipped with said magnetic head slider support mechanism defined by claim 1.

22. A magnetic disk device equipped with said magnetic head slider support mechanism defined by claim 2.

23. A magnetic disk device equipped with said magnetic head slider support mechanism defined by claim 3.

24. A magnetic disk device equipped with said magnetic head slider support mechanism defined by claim 4.

25. A magnetic disk device equipped with said magnetic head slider support mechanism defined by claim 5.

26. A magnetic disk device equipped with said magnetic head slider support mechanism defined by claim 6.

27. A magnetic disk device equipped with said magnetic head slider support mechanism defined by claim 7.

28. A magnetic disk device equipped with said magnetic head slider support mechanism defined by claim 8.

29. A magnetic disk device equipped with said magnetic head slider support mechanism defined by claim 9.

30. A magnetic disk device equipped with said magnetic head slider support mechanism defined by claim 10.

31. A magnetic disk device equipped with said magnetic head slider support mechanism defined by claim 11.

32. A magnetic disk device equipped with said magnetic head slider support mechanism defined by claim 12.

33. A magnetic disk device equipped with said magnetic head slider support mechanism defined by claim 13.

34. A magnetic disk device equipped with said magnetic head slider support mechanism defined by claim 14.

35. A magnetic disk device equipped with said magnetic head slider support mechanism defined by claim 15.

36. A magnetic disk device equipped with said magnetic head slider support mechanism defined by claim 16.

37. A magnetic disk device equipped with said magnetic head slider support mechanism defined by claim 17.

38. A magnetic disk device equipped with said magnetic head slider support mechanism defined by claim 18.

39. A magnetic disk device equipped with said magnetic head slider support mechanism defined by claim 19.

40. A magnetic disk device equipped with said magnetic head slider support mechanism defined by claim 20.

41. A magnetic disk device, according to claim 21, further comprising a magnetic head slider lift and drop mechanism that lifts and drops said magnetic head slider from and onto said magnetic disk through said magnetic head slider support mechanism.

42. A magnetic disk device, according to claim 22, further comprising a magnetic head slider lift and drop mechanism that lifts and drops said magnetic head slider from and onto said magnetic disk through said magnetic head slider support mechanism.

43. A magnetic disk device, according to claim 23, further comprising a magnetic head slider lift and drop mechanism that lifts and drops said magnetic head slider from and onto said magnetic disk through said magnetic head slider support mechanism.

44. A magnetic disk device, according to claim 24, further comprising a magnetic head slider lift and drop mechanism that lifts and drops said magnetic head slider from and onto said magnetic disk through said magnetic head slider support mechanism.

45. A magnetic disk device, according to claim 25, further comprising a magnetic head slider lift and drop mechanism that lifts and drops said magnetic head slider from and onto said magnetic disk through said magnetic head slider support mechanism.

46. A magnetic disk device, according to claim 26, further comprising a magnetic head slider lift and drop mechanism that lifts and drops said magnetic head slider from and onto said magnetic disk through said magnetic head slider support mechanism.

47. A magnetic disk device, according to claim 27, further comprising a magnetic head slider lift and drop mechanism that lifts and drops said magnetic head slider from and onto said magnetic disk through said magnetic head slider support mechanism.

48. A magnetic disk device, according to claim 28, further comprising a magnetic head slider lift and drop mechanism that lifts and drops said magnetic head slider from and onto said magnetic disk through said magnetic head slider support mechanism.

49. A magnetic disk device, according to claim 29, further comprising a magnetic head slider lift and drop mechanism that lifts and drops said magnetic head slider from and onto said magnetic disk through said magnetic head slider support mechanism.

50. A magnetic disk device, according to claim 30, further comprising a magnetic head slider lift and drop mechanism that lifts and drops said magnetic head slider from and onto said magnetic disk through said magnetic head slider support mechanism.

51. A magnetic disk device, according to claim 31, further comprising a magnetic head slider lift and drop mechanism that lifts and drops said magnetic head slider from and onto said magnetic disk through said magnetic head slider support mechanism.

52. A magnetic disk device, according to claim 32, further comprising a magnetic head slider lift and drop mechanism that lifts and drops said magnetic head slider from and onto said magnetic disk through said magnetic head slider support mechanism.

53. A magnetic disk device, according to claim 33, further comprising a magnetic head slider lift and drop mechanism that lifts and drops said magnetic head slider from and onto said magnetic disk through said magnetic head slider support mechanism.

54. A magnetic disk device, according to claim 34, further comprising a magnetic head slider lift and drop mechanism that lifts and drops said magnetic head slider from and onto said magnetic disk through said magnetic head slider support mechanism.

55. A magnetic disk device, according to claim 35, further comprising a magnetic head slider lift and drop mechanism that lifts and drops said magnetic head slider from and onto said magnetic disk through said magnetic head slider support mechanism.

56. A magnetic disk device, according to claim 36, further comprising a magnetic head slider lift and drop mechanism that lifts and drops said magnetic head slider from and onto said magnetic disk through said magnetic head slider support mechanism.

57. A magnetic disk device, according to claim 37, further comprising a magnetic head slider lift and drop mechanism that lifts and drops said magnetic head slider from and onto said magnetic disk through said magnetic head slider support mechanism.

58. A magnetic disk device, according to claim 38, further comprising a magnetic head slider lift and drop mechanism that lifts and drops said magnetic head slider from and onto said magnetic disk through said magnetic head slider support mechanism.

59. A magnetic disk device, according to claim 39, further comprising a magnetic head slider lift and drop mechanism that lifts and drops said magnetic head slider from and onto said magnetic disk through said magnetic head slider support mechanism.

60. A magnetic disk device, according to claim 40, farther comprising a magnetic head slider lift and drop mechanism that lifts and drops said magnetic head slider from and onto said magnetic disk through said magnetic head slider support mechanism.

* * * * *